United States Patent [19]

von Loewis of Menar

[11] 4,415,614
[45] Nov. 15, 1983

[54] DECORATIVE HOLLOW VITREOUS ARTICLE AND METHOD OF MAKING SAME

[75] Inventor: Axel von Loewis of Menar, Bochum, Fed. Rep. of Germany

[73] Assignee: Herner Glas Bernd Hoffbauer, Herne, Fed. Rep. of Germany

[21] Appl. No.: 355,900

[22] Filed: Mar. 8, 1982

Related U.S. Application Data

[63] Continuation-in-part of Ser. No. 164,531, Jul. 2, 1980, abandoned.

[30] Foreign Application Priority Data

Jul. 5, 1979 [DE] Fed. Rep. of Germany ....... 2927112

[51] Int. Cl.³ .................... C03B 23/20; B32B 17/12; B44F 1/06
[52] U.S. Cl. .......................... 428/38; 65/36; 65/46; 65/48; 428/228; 428/428
[58] Field of Search ................. 65/48, 46, 36; 428/38, 428/228, 428

[56] References Cited

U.S. PATENT DOCUMENTS

1,816,045  7/1931  Haley .
2,183,961 12/1939  Fischer ................................. 65/46
3,113,831 12/1963  Coale .............................. 65/48 UX

FOREIGN PATENT DOCUMENTS

22539 12/1905  Austria .
98846  7/1897  Fed. Rep. of Germany .
1086407  8/1961  Fed. Rep. of Germany .

Primary Examiner—Arthur D. Kellogg
Attorney, Agent, or Firm—Karl F. Ross; Herbert Dubno

[57] ABSTRACT

A decorative vitreous article is produced by blowing a glass parison in a mold against a coherent flexible web of glass fibers which thereby become partly or entirely embedded therein. After reheating, possibly by immersion of the parison in a bath of molten glass to cover exposed web portions by a further glass layer, the resulting body is blown into its final shape.

5 Claims, 3 Drawing Figures

DECORATIVE HOLLOW VITREOUS ARTICLE AND METHOD OF MAKING SAME

CROSS-REFERENCE TO RELATED APPLICATION

This is a continuation-in-part of my copending application Ser. No. 164,531 filed 2 July 1980 and now abandoned.

FIELD OF THE INVENTION

My present invention relates to decorative hollow vitreous articles with a patterned wall surface and to a method of making such articles.

BACKGROUND OF THE INVENTION

In the glass-making art it is known to form hollow articles with decorative surface patterns by cutting, laminating, etching or similar procedures.

Among these are the filigree techniques which were developed as early as the middle ages by Venetian glass masters and which were applied to transparent, colorless or colored glass for unique esthetic effects. These filigree techniques could be used in lieu of painting or engraving to generate a variey of patterns on glass articles of various shapes.

Improvements on the manually practiced Venetian filigree techniques led to a process by which a cylindrical mold of clay or iron, for example, is lined internally with uniformly spaced opaque, white or colored glass rods which are fixed to the inner wall of that mold, e.g. with clay, whereupon a hot, generally colorless parison of glass is inserted on a blow pipe into the mold and is expanded into contact with the rods which adhere to the parison and form a pattern thereon. The parison carrying these rods is reheated and stretched, twisted and otherwise deformed into a hollow conical body with an array of glass rods of reduced thickness extending helically around its circumference. Two such bodies with opposite twist could be intercalated and fused together to form a pattern of intersecting helicoidal lines.

With such a procedure, the production of more intricate, finely structured patterns is highly complicated.

OBJECT OF THE INVENTION

The object of my present invention is to provide a relatively inexpensive decorative hollow glass article with a filigree-type pattern, as well as a method of mass-producing such articles in a simple and expeditious manner.

SUMMARY OF THE INVENTION

In accordance with my present invention, a coherent but flexible web of glass fibers—woven, knitted, matted or otherwise interconnected—is embedded in a body of hot, viscous glass, specifically a parison blown in a mold, which partly or completely penetrates into the interstices of the web so that substantial portions of the fibers become immersed in the molten or semimolten expanding glass mass. The heat of this mass caues the immersed fiber portions to fuse into the parison even though traces thereof remain visible to the eye after the glass has cooled, especially if the fibers are of a distinctive optical appearance (coloration or light-transmitting characteristics) to begin with.

Thus, even if the fibers are fully embedded in the hollow glass body, they form a contrasting pattern on all or part of its surface.

Thanks to its flexibility, the web readily conforms to the curvature of a parison of cylidrical, spherical or any other configuration. After reheating, the parison with the partly or fully embedded web is further expanded—with or without the aid of another mold—into its final form.

The glass fibers here referred to may be monofilaments, also known as glass silk, possibly twisted or spun together to form a yarn, or combined into rovings. They could also be staple fibers bundled or twisted into strands. The individual filaments or staples should have diameters of up to 13 microns, preferably between about 4 and 9 microns. Such fibers are conventionally made by nozzle-drawing, rod-drawing or nozzle-blowing processes. The resulting webs may have thicknesses between 8 and 30 microns, for example.

If desired, a web only partly embedded in the parison after the first blowing step can be covered with an additional layer of molten glass before final expansion. Air occlusions in the interstices of the web may then create bubbles in the glass body giving rise to a particularly interesting pattern.

In all instances, the method according to my invention eliminates the need for bonding or otherwise immobilizing a set of individual glass rods in a mold and for subjecting the blown parison to any twisting or other deformation except for a simple inflation.

It should be noted that the fused-in fiber portions have virtually the same structural strength as the surrounding glass mass and therefore do not act as a reinforcement therefor. Their effect, accordingly, is basically ornamental; fibers partially projecting from the body surface, however, may also serve to give the user a more secure grip of a bottle, cup, lamp chimney or other article so embellished.

BRIEF DESCRIPTION OF THE DRAWING

The above and other features of my present invention will now be described in detail with reference to the accompanying drawing in which.

SPECIFIC DESCRIPTION

Figure 1:
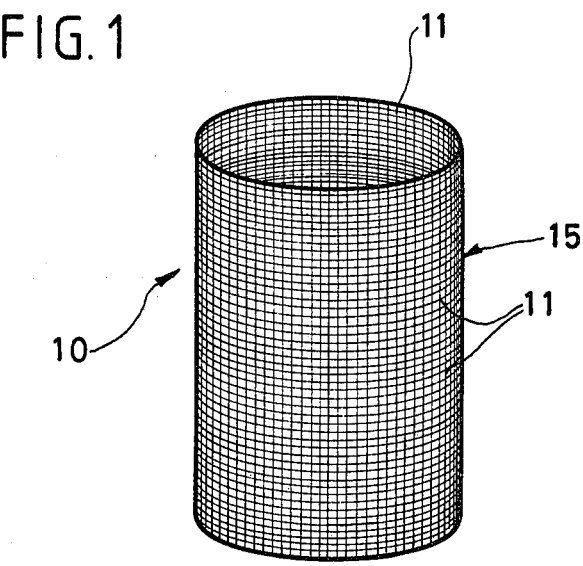
FIG. 1 is a perspective view of a hollow cylindrical vitreous body made in accordance with this invention.

As can be seen from FIG. 1, a lamp chimney 10 of glass is provided with a grid-like pattern formed by a flexible thin woven textile fabric 11 of glass filaments or staple fibers as discussed above.

Figure 2:
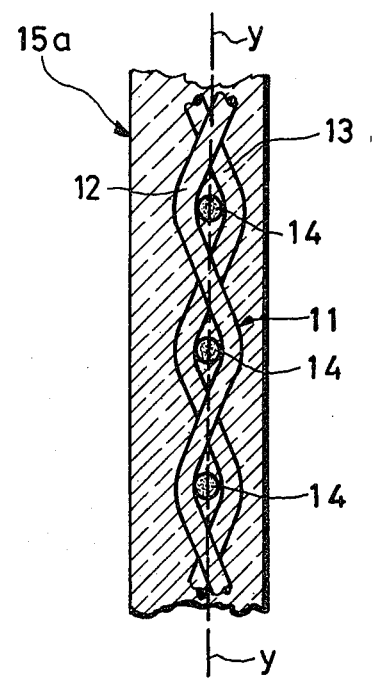
FIG. 2 is an enlarged fragmentary sectional view of the wall of that body.

This fabric 11, as seen in FIG. 2, has a linen or canvas weave with warp threads 12, 13 and weft threads 14. Each of these threads, as has been shown for the weft threads 14, can be a yarn or strand formed from a plurality of elemental glass filaments or fibers.

In making the article of FIGS. 1 and 2, a parison 15a is contacted with the web 11 in a nonillustrated blow mold. The web is initially cut, e.g. by stamping, to the appropriate size and placed in the mold after which a glob of glass melt on a blow pipe is inserted into the mold and inflated to form the parison which thereupon expands against the web and partially into it, e.g. to a line y—y bisecting its cross-section. The embedded parts of the filaments fuse into the surrounding glass mass before it cools.

Any portions of the web which project beyond the parison surface can be pressed into that surface or smoothed thereagainst (after reheating, if need be) by an appropriate tool, or else the parison with the fibers partly fused into it can be immersed in a bath of molten glass to cover the web with another layer thereof and fully embed it in the resulting body as has been shown in FIG. 2; the fiber portions engulfed by that layer fuse into same under the heat of the molten glass which may make futher heating unnecessary before final blowing.

Figure 3:
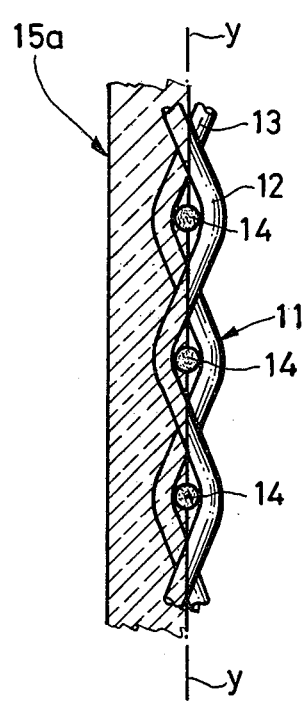
FIG. 3 is a similar sectional view of a modified wall portion made by my improved method.

Alternatively, the pattern web may be left to project from the body surface as shown in FIG. 3. In this case the final blow must be preceded by a reheating step, care being taken to avoid any significant deformation of the exposed fiber portion whose flexibility enables a limited expansion without destruction of the pattern.

I claim:

1. A method of making a hollow vitreous article with a decorative pattern, comprising the steps of:
   (a) providing a flexible woven fabric of glass fibers forming intersecting warp and weft threads;
   (b) cutting said fabric to a size fitting into a given blow mold;
   (c) placing the cut fabric in said blow mold;
   (d) blowing a glass parison in said mold into contact with said fabric with at least partial penetration of the interstices of said fabric by the expanding glass mass whereby at least portions of said fibers are embedded in said mass;
   (e) reheating said parison with the fabric adhering thereon into a blowable state;
   (f) expanding the reheated parison and fabric by a further blow into a body of predetermined final shape; and
   (g) allowing said body to cool.

2. A method as defined in claim 1 wherein the reheating in step (e) includes immersing said parison into a bath of molten glass to cover exposed parts of said fabric with a further glass layer.

3. A method as defined in claim 1 wherein said fibers have a diameter not exceeding 13 microns.

4. A method as defined in claim 1 wherein said fibers initially have an optical appearance different from that of the glass forming the parison.

5. An article made by the method of claim 1, 2, 3 or 4.

* * * * *